United States Patent
Jang et al.

(10) Patent No.: US 11,676,520 B2
(45) Date of Patent: Jun. 13, 2023

(54) POWER MANAGEMENT DEVICE AND DISPLAY DEVICE INCLUDING THE SAME

(71) Applicant: SILICON WORKS CO., LTD., Daejeon (KR)

(72) Inventors: Geon Soo Jang, Daejeon (KR); Hyung Sub Kim, Daejeon (KR); Jung Hyun Tark, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/408,047

(22) Filed: Aug. 20, 2021

(65) Prior Publication Data

US 2022/0068180 A1 Mar. 3, 2022

(30) Foreign Application Priority Data

Aug. 25, 2020 (KR) .......................... 10-2020-0106916

(51) Int. Cl.
*G09G 3/20* (2006.01)
*G06F 3/041* (2006.01)

(52) U.S. Cl.
CPC ............. *G09G 3/20* (2013.01); *G06F 3/0412* (2013.01); *G06F 3/0416* (2013.01); *G09G 2310/08* (2013.01); *G09G 2320/0223* (2013.01); *G09G 2330/021* (2013.01); *G09G 2330/028* (2013.01)

(58) Field of Classification Search
None
See application file for complete search history.

(56) References Cited

U.S. PATENT DOCUMENTS

| 10,775,931 | B2 | 9/2020 | Kim | |
|---|---|---|---|---|
| 10,824,271 | B2 | 11/2020 | Kim et al. | |
| 2013/0328824 | A1* | 12/2013 | Krah | G06F 3/04166 345/174 |
| 2014/0210779 | A1* | 7/2014 | Katsuta | G06F 3/0412 345/174 |
| 2016/0180771 | A1* | 6/2016 | Jeong | G09G 3/3258 345/82 |
| 2016/0293106 | A1* | 10/2016 | Seo | G09G 3/20 |
| 2016/0343293 | A1* | 11/2016 | Kim | G09G 3/20 |
| 2017/0032753 | A1 | 2/2017 | Kim et al. | |
| 2018/0150184 | A1* | 5/2018 | Kim | G06F 3/044 |
| 2019/0102036 | A1* | 4/2019 | Kim | G06F 3/0443 |

FOREIGN PATENT DOCUMENTS

| KR | 10-2018-0009023 A | 1/2018 |
|---|---|---|
| KR | 10-2018-0061471 A | 6/2018 |
| KR | 10-2019-0023859 A | 3/2019 |
| KR | 10-2018691 B1 | 9/2019 |

\* cited by examiner

*Primary Examiner* — Dorothy Harris
(74) *Attorney, Agent, or Firm* — Rothwell, Figg, Ernst & Manbeck, P.C.

(57) ABSTRACT

The present disclosure relates to a technology for a power management device applied to a display device, in which driving voltages having different levels are supplied to driving devices having different sizes of load in different times, and this allows all of the driving devices to stably receive voltages within a limited range even though the number of driving devices increases according to the enlargement of a display panel.

8 Claims, 8 Drawing Sheets

--Prior Art--

POWER MANAGEMENT DEVICE AND DISPLAY DEVICE INCLUDING THE SAME

CROSS REFERENCE TO RELATED APPLICATION

This application claims priority from Republic of Korea Patent Application No. 10-2020-0106916, filed on Aug. 25, 2020, which is hereby incorporated by reference in its entirety.

BACKGROUND

1. Field of Technology

The present disclosure relates to a technology for supplying power to an apparatus driving a display device.

2. Description of the Prior Art

As the size of a display panel becomes large, the number of devices for driving the display panel has gradually increased.

A representative device for driving the display panel is a source driver for driving data lines connected to pixels. The source driver may include a plurality of channels connected to the data lines one-to-one. However, since there is a limitation on the number of channels which can be included in one source driver, a plurality of source drivers operate in divided areas in one display device. Further, as the size of the display device becomes large and thus the number of data lines increases according thereto, the number of source drivers included in one display device also increases.

The large size of the display panel not only increases the number of driving devices but also increases the length of wires connected to the driving device. The increase in the length of the wires may cause a voltage drop due to line impedance and thus make an unbalance in voltage between driving devices. For example, the display device may include a smaller number of power management devices than source drivers and, in such a structure, one power management device supplies a driving voltage to a plurality of source drivers. At this time, a plurality of source drivers connected to one power management device receive different voltage drop effects by line impedance depending on a relative distance from the power management device. For example, a source driver arranged to be close to the power management device receives a small voltage drop effect by line impedance and a source driver arranged to be far therefrom receives a large voltage drop effect by line impedance. Such a voltage drop difference may cause an unbalance in driving voltages input into respective source drivers. The problem of a voltage unbalance between source drivers becomes more serious as the size of the display panel becomes large and thus the number or distance of source drivers connected to one power management device increases.

The problem of a voltage unbalance between driving devices becomes more serious when the driving devices perform complex functions. In the display device, one driving device may perform a complex function. For example, a Source Readout Integrated Circuit (SRIC) may drive data lines connected to pixels as one function, and may drive a sensor, for example, a touch sensor and read a sensing value as another function. The driving device having such a complex function may have a difference in current or power used for performing the functions, thereby making the problem of a voltage unbalance due to line impedance worse.

Meanwhile, the voltage unbalance may cause a problem of spec out. A voltage range in which the driving device can receive input may be limited to a predetermined range due to characteristics of an element or a circuit. When a voltage supplied to the driving device corresponds to the predetermined range, it may be determined as spec in, and otherwise, it may be determined as spec out. However, as described above, when a voltage unbalance between driving devices becomes larger, a problem may occur in which one driving device becomes spec in and the other driving device becomes spec out.

SUMMARY OF THE INVENTION

In this background, an aspect of the present embodiment is to provide a technology for controlling a power management device such that all of the voltages supplied to a plurality of display driving devices are within a limited range.

In accordance with an aspect of the present disclosure, a display device comprises: at least one driving device configured to transmit data voltages to pixels disposed on a panel in a display time section and to transmit touch driving signals to the sensors disposed in the panel in a touch sensing time section; a power management device connected with the at least one driving device through a power supply line and configured to supply a first voltage having a first level to the power supply line in the display time section and to supply a second voltage having a second level higher than the first level to the power supply line in the touch sensing time section; and a timing control device configured to supply a timing control signal indicating the display time section and the touch sensing time section to the at least one driving device or to the power management device.

The at least driving device may supply a common voltage to the sensor in the display time section and transmit the touch driving signal to the sensor in the touch sensing time section. Here, an amount of current consumed for generating the touch driving signal may be larger than an amount of current consumed for generating the data voltage.

In accordance with another aspect of the present disclosure, a power management device connected with display driving devices through a power supply line is provided. The power management device comprises: a first voltage generation module configured to generate a first voltage having a first level; a second voltage generation module configured to generate a second voltage having a second level higher than the first level; and an output control circuit configured to receive a timing control signal indicating a display time section and a touch sensing time section, to output, through switch circuits, the first voltage to the power supply line in the display time section and the second voltage to the power supply line in the touch sensing time section.

The driving devices may receive the timing control signal from a timing control device configured to transmit image data and distinguish between a driving time for pixels and a driving time for sensors, and the output control circuit may receive the timing control signal from the timing control device and recognize the display time section and the touch sensing time section.

In accordance with another aspect of the present disclosure, a power management device connected to display driving devices through power supply line is provided. The power management device includes: a gate control circuit configured to turn on or off a power switch configured to adjust voltages of both ends of an inductor for power conversion; a feedback loop circuit configured to generate a comparison signal by comparing a sensing voltage for an output with a reference and to transmit a control signal for the gate control circuit according to the comparison signal; and a control circuit configured to control the reference to correspond to a first voltage in a display time section and to control the reference to correspond to a second voltage higher than the first voltage in a touch sensing time section or to control the sensing voltage to correspond to the first voltage in the display time section and to control the sensing voltage to correspond to the second voltage in the touch sensing time section.

The control circuit may comprise a switch circuit configured to select and output one of a plurality of references and may select one of the plurality of references according to a timing control signal and output the same.

The display driving device may supply a predetermined direct current (DC) voltage to a sensor in the display time section and supply a touch driving signal to the sensor in the touch sensing time section.

The display driving device may have a lower level of an output current in the display time section than an output current in the touch sensing time section.

In accordance with another aspect of the present disclosure, a power management device connected with display driving devices through power supply line is provided. The power management device includes: a gate control circuit configured to turn on or off a power switch configured to adjust voltages of both ends of an inductor for power conversion; a feedback loop circuit configured to generate a comparison signal by comparing a sensing voltage for an output with a reference and to transmit a control signal for the gate control circuit according to the comparison signal; and a sensing voltage control circuit configured to control the sensing voltage to correspond to a first voltage in a display time section and to control the sensing voltage to correspond to a second voltage higher than the first voltage in a touch sensing time section.

According to the present embodiment described above, it is possible to minimize a difference in device voltages supplied to display driving devices in spite of a large size of a display panel. Further, according to the present embodiment, although driving devices perform a plurality of functions and there is a difference between the functions in the current or power use, all of the driving voltages input from the power management device may be within the limited range. In addition, according to the present embodiment, all of the voltages supplied to a plurality of display driving devices may be within the limited range in spite of the large size thereof.

DETAILED DESCRIPTION OF THE EXEMPLARY EMBODIMENTS

Figure 1:
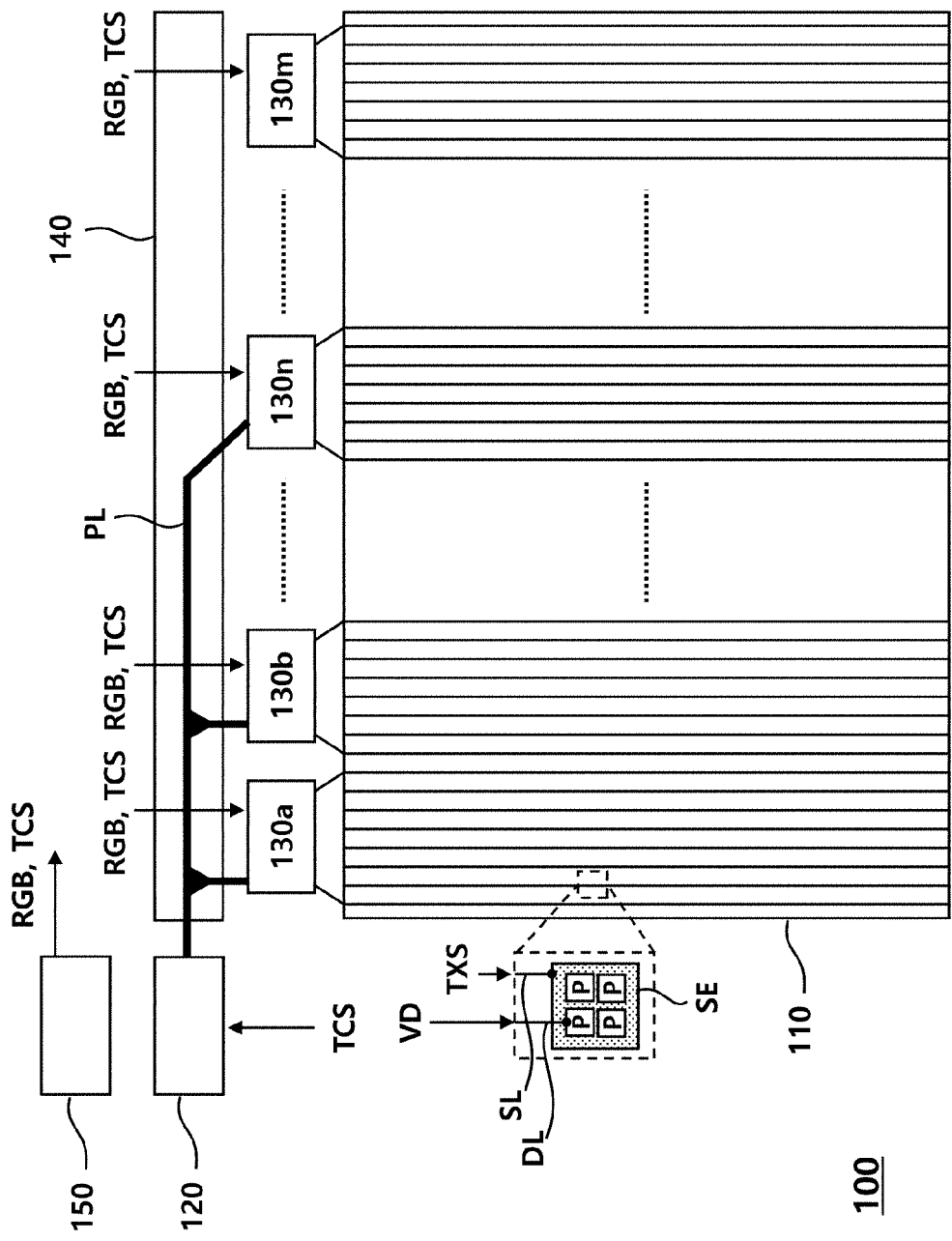
FIG. 1 is a block diagram illustrating a display device according to an embodiment.

FIG. 1 is a block diagram illustrating a display device according to an embodiment.

Referring to FIG. 1, a display device 100 may include a panel 110, a power management device 120, driving devices 130a to 130m, a wiring device 140, a timing control device 150, and the like.

A plurality of pixels P and a plurality of sensors SE may be arranged on the panel 110.

The pixel P is a unit element for displaying an image, and brightness may be controlled according to a gradation value included in pixel data. The pixels P are connected to the driving devices 130a to 130m through data lines DL, and the driving devices 130a to 130m may supply a data voltage VD to the data lines DL to control brightness of the pixels P. The driving devices 130a to 130m may receive image data RGB from the timing control device 150 and the like, convert pixel data included in the image data RGB to a data voltage VD corresponding to an analog voltage, and supply the data voltage VD to each data line DL.

The sensor SE is a unit element for detecting a touch or proximity of an external object, and may be driven by a touch driving signal TXS. The sensors SE may be connected to the driving devices 130a to 130m through sensor lines SL, and the driving devices 130a to 130m may supply the touch driving signal TXS and read a response signal generated in the sensors SE to generate a sensing value. Further, the driving device 130a to 130m may convert the sensing value into sensing data and transmit the sensing value to, for example, a Touch Main Control Unit (TMCU).

The size of the pixels P may be smaller than the size of the sensors SE. Accordingly, a plurality of pixels P may overlap in one sensor SE. In one frame, the data voltage VD may have the form of a DC voltage. For example, when pixel data is determined as a specific value, the data voltage VD may maintain a specific DC voltage according to the pixel data. On the other hand, the touch driving signal TXS may have the form of an AC voltage in one frame. The touch driving signal TXS may have the form of an AC voltage such as a square wave, a sine wave, or the like, and the driving devices 130a to 130m may supply the touch driving signal TXS to the sensors SE and sense the size of a response signal according to a change in capacitance of the sensors SE.

Meanwhile, the size of capacitance generated by the data lines DL and the pixels P is limited and the DC voltage is supplied to the data lines DL, and thus relatively small current or power may be used when the pixels P are driven. On the other hand, since the size of capacitance generated by the sensors SE is relatively large and the AC voltage is supplied to the sensor lines SL, relative large current or power may be used when the sensors SE are driven.

When the driving devices 130a to 130m perform the two functions of driving the pixels P and driving the sensors SE, the current or power used for performing the functions may be different from each other as described above. Such a difference may cause a difference in time of the voltages supplied from the power management device 120.

The power management device 120 may supply the driving voltage to the plurality of driving devices 130a to 130*m* through power supply line PL. Some of the power supply line PL may be arranged on the wiring device 140. The wiring device 140 may include a Flexible Printed Circuit Board (FPCB), and the power supply line PL may be arranged via the FPCB. A connector having a physical structure may be arranged on the power supply line PL. The power supply line PL may have line impedance, and the line impedance may increase due to a characteristic of the FPCB and a characteristic of the connector. The driving voltage supplied to the plurality of driving devices 130*a* to 130*m* may be dropped due to the line impedance and input into the driving devices 130*a* to 130*m*. A driving device of which a wire arranged between the driving device and the power management device 120 is short may have a small voltage drop (line voltage) by line impedance, and a driving device of which a wire arranged between the driving device and the power management device 120 is long may have a large voltage drop (line voltage) by line impedance. For example, the magnitude of the line voltage generated on the wire between the first driving device 130*a* and the power management device 120, which is arranged closest to the power management device 120 may be smaller than the magnitude of the line voltage generated on the wire between the Nth driving device 130*n* and the power management device 120, which is arranged farthest from the power management device 120.

The power management device 120 may generate the voltages such that a time difference and a location difference in the voltages supplied to the driving devices 130*a* to 130*m* are minimized and supply the generated voltages.

The power management device 120 may supply a first voltage to the power supply line PL in a first time section having a small load of the driving devices 130*a* to 130*m* and supply a second voltage to the power supply line PL in a second time section having a relatively large load. For example, the power management device 120 may supply the first voltage having a first level to the power supply line PL in a display time section in which the driving devices 130*a* to 130*m* supply the data voltage VD to the pixels and supply the second voltage having a second level to the power supply line PL in a touch sensing time section in which the driving devices 130*a* to 130*m* supply the touch driving signal TXS to the sensors SE. The second level may be higher than the first level.

A timing control signal TCS for separating the first time section and the second time section may be generated by the timing control device 150. The timing control device 150 may generate the timing control signal TCS, transmit the timing control signal TCS to the driving devices 130*a* to 130*m*, and transmit the timing control signal TCS to the power management device 120.

Hereinafter, for convenience of description, the display time section and the touch sensing time section are described as examples of the first time section and the second time section. However, the present embodiment is not limited thereto, and it may be understood that the first time section is a time section in which the load is relatively small and the second time section is a time section in which the load is relatively large. Alternatively, it may be understood that the first time section is a time section in which the DC voltage is supplied as the load and the second time section may be a time section in which the AC voltage is supplied as the load.

Separation of the time sections and driving of different loads by the driving devices 130*a* to 130*m* result from the miniaturization or integration of the driving devices. As one of the driving devices 130*a* to 130*m* performs a plurality of functions, the total size of the driving devices may be reduced and power consumption may also be reduced. Gains due to the miniaturization, thinning, and low power further increase when some elements within the panel 110 perform two or more functions, and an in-cell type panel is a representative example.

Figure 2:
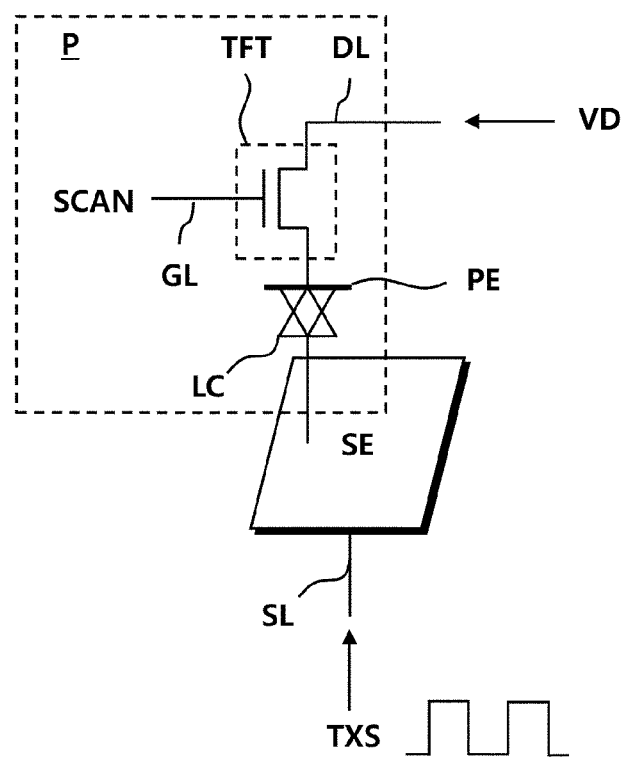
FIG. 2 illustrates the structure of a pixel and a sensor in an in-cell type panel.

FIG. 2 illustrates the structure of a pixel and a sensor in an in-cell type panel.

Referring to FIG. 2, a pixel electrode PE, a liquid crystal LC, and a transistor TFT may be arranged on the pixel P. A drain of the transistor TFT may be connected to a data line DL, a source thereof may be connected to the pixel electrode PE, and a gate thereof may be connected to a gate line GL. When a scan signal SCAN supplied to the gate line GL becomes a high level, the transistor TFT may be turned on and a data voltage VD generated on the data line DL may be supplied to the pixel electrode PE. When the scan signal SCAN becomes a low level, the transistor TFT may be turned off and a data voltage VD generated on the electrode PE may be maintained during one frame. The liquid crystal LC may control an amount of light supplied from a backlight to control brightness of the pixel P while varying an angle depending on the voltage generated on the pixel electrode PE. In such a structure, the data voltage VD is used only during a time at which the voltage is charged to the pixel electrode PE, and thus power used therefor may not be large.

Meanwhile, in the in-cell type panel, the pixel electrode PE controls the liquid crystal LC on the basis of a voltage difference from the sensor SE, and at this time, the sensor SE functions as a common electrode for providing a common voltage. A time section in which the data voltage VD is supplied to the pixel P may be a display time section, and a common voltage corresponding to the DC voltage may be supplied to the sensor SE in the display time section.

When the display time section ends, the sensor SE is used as an electrode for detecting a touch, and such a time may be a touch sensing time section. In the touch sensing time section, the touch driving signal TXS is supplied to the sensing line SL connected to the sensor SE, and at this time, the touch driving signal TXS may have a waveform of a square wave as illustrated. Since the sensor SE has a relatively large area and has large capacitance generated between the sensor SE and a neighboring electrode, much power is used to generate the touch driving signal TXS having the form of the AC voltage.

In such a structure, the waveform of the voltage input into each driving device at each time and each location is described compared to the prior art.

Figure 3:
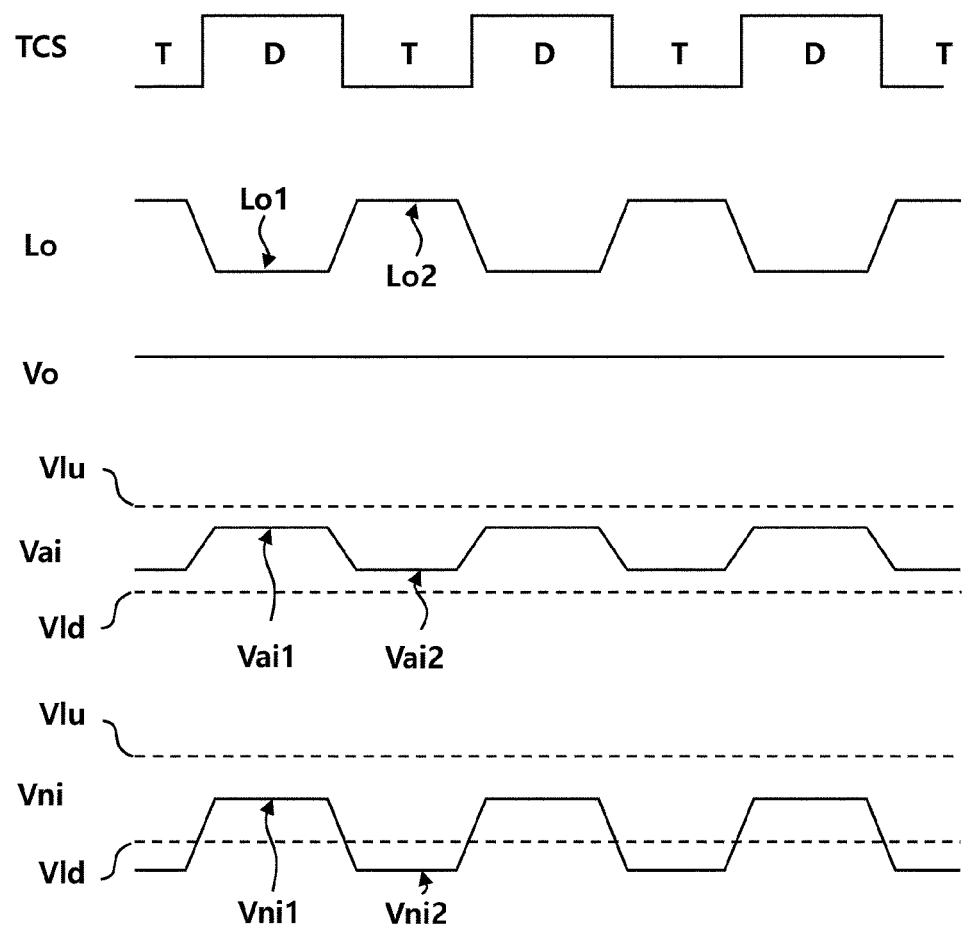
FIG. 3 illustrates main voltage and current waveforms according to the prior art.

FIG. 3 illustrates main voltage and current waveforms according to the prior art.

Referring to FIG. 3, the timing control signal TCS may have a voltage at a high level in a display time section D and a voltage at a low level in a touch sensing time section T such that time sections are separated into the display time section D and the touch sensing time section T.

A load current Lo may be a first current Lo1 in the display time section D, and the load current Lo may be a second current Lo2 in the touch sensing time section T. A level of the second current Lo2 may be higher than a level of the first current Lo1. An output voltage Vo of the power management device may remain at a single level.

A first driving voltage Vai supplied to the first driving device arranged closest to the power management device through the power supply line may have a voltage level of Vai1 in the display time section D and have a voltage level of Vai2 in the touch sensing time section T. An Nth driving voltage Vni supplied to the Nth driving device arranged farthest from the power management device through the power supply line may have a voltage level of Vni1 in the display time section D and have a voltage level of Vni2 in the touch sensing time section T.

The voltage input into each driving device through the power supply line may be limited to a predetermined range. When the upper limit of the predetermined range is an upper voltage level Vlu and the lower limit thereof is a lower voltage level Vld, the first driving voltage Vai may be within the predetermined range since both Vai1 and Vai2 are lower than the upper voltage level Vlu and higher than the lower voltage level Vld.

On the other hand, with respect to the Nth driving voltage Vni, Vni1 may be within the predetermined range, but Vni2 may be lower than the lower voltage level Vld and may escape the predetermined range.

In order to solve the spec out problem in the prior art, the power management device according to an embodiment may differently control levels of the output voltages at different times.

Figure 4:
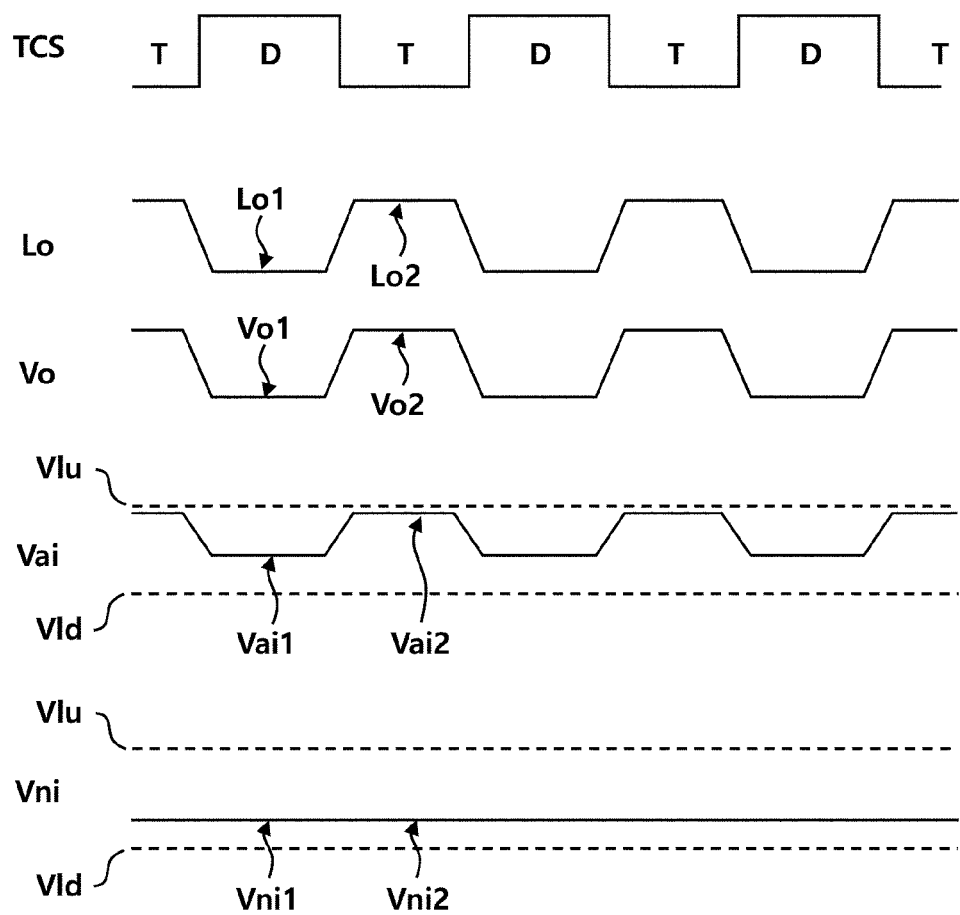
FIG. 4 illustrates main voltage and current waveforms according to the present embodiment.

FIG. 4 illustrates main voltage and current waveforms according to the present embodiment.

Referring to FIG. 4, a timing control signal TCS may have a voltage at a high level in a display time section D and a voltage at a low level in a touch sensing time section T such that time sections are separated into the display time section D and the touch sensing time section T.

A load current Lo may be a first current Lo1 in the display time section D, and the load current Lo may be a second current Lo2 in the touch sensing time section T. A level of the second current Lo2 may be higher than the first current Lo1.

The power management device may supply a first voltage Vo1 having a first level to the power supply line in the display time section D and supply a second voltage Vo2 having a second level to the power supply line in the touch sensing time section T. The first level may be lower than the second level.

The voltage input into each driving device through the power supply line may be limited to a predetermined range. When the upper limit of the predetermined range is an upper voltage level Vlu and the lower limit thereof is a lower voltage level Vld, the first driving voltage Vai may be within the predetermined range since both Vai1 and Vai2 are lower than the upper voltage level Vlu and higher than the lower voltage level Vld.

Also, in the Nth driving voltage Vni, both the voltage Vni1 generated in the display time section and the voltage Vni2 generated in the touch sensing time section are lower than the upper voltage level Vlu and higher than the lower voltage level Vld and thus may be within the predetermined range.

The power management device may generate an output voltage Vo such that a driving voltage difference of the driving device arranged farthest from the power management device at different times is minimized. For example, when a line voltage in the display time section is a first line voltage and a line voltage in the touch sensing time section is a second line voltage for the Nth driving device arranged farthest from the power management device, the power management device may control a difference Vo2−Vo1 of output voltages Vo at different times to be substantially the same as a difference between the second line voltage and the first line voltage. Through the control, the driving voltages Vni of the Nth driving device may have little difference at different times, and a designer can more easily check whether the driving voltages Vni become spec in.

Through the comparison of differences between the first voltage and the second voltage input into the plurality of driving devices from the power supply line, it may be noted that the difference between the first voltage Vai1 and the second voltage Vai2 of the first driving device arranged closest to the power management device is larger than the difference between the first voltage Vni1 and the second voltage Vni2 of the Nth driving device arranged farthest from the power management device. The power management device may control levels of the first voltage and the second voltage such that the difference between the first voltage and the second voltage input into each driving device becomes smaller as the distance from the power management device becomes greater.

The power management device according to an embodiment may be implemented in various forms. The power management device may be implemented in the form of one integrated circuit or in the form of a plurality of integrated circuits. In FIGS. 5 to 8, implementation examples of the power management device are described.

Figure 5:
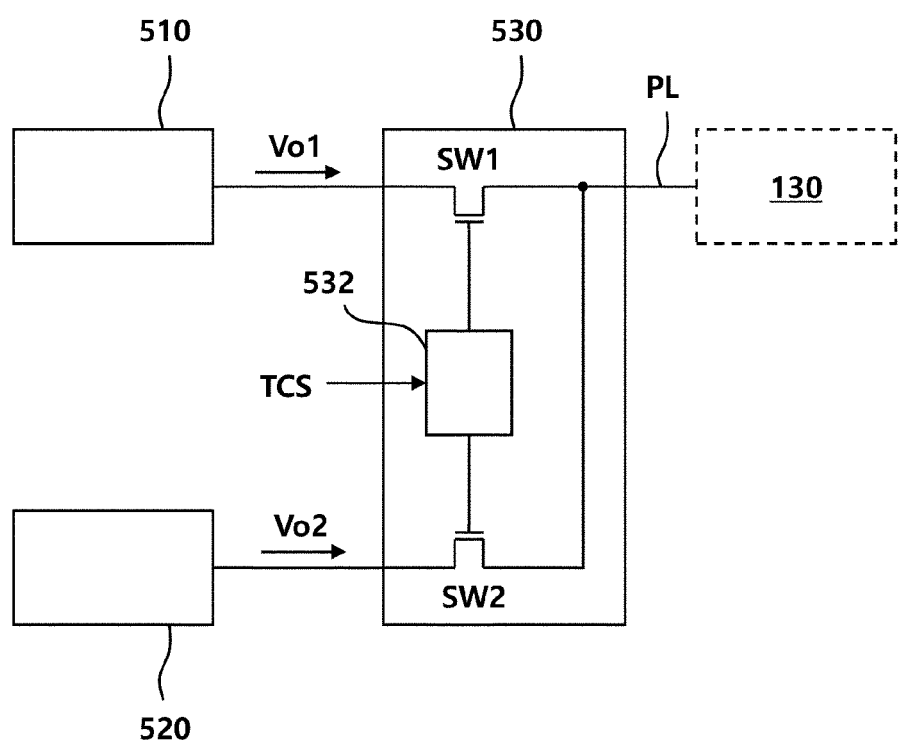
FIG. 5 is a block diagram illustrating a first example of a power management device according to an embodiment.

FIG. 5 is a block diagram illustrating a first example of the power management device according to an embodiment.

Referring to FIG. 5, the power management device 120a may include a first voltage generation module 510, a second voltage generation module 520, an output control circuit 530, and the like.

The first voltage generation module 510 may generate a first voltage Vo1 having a first level. The second voltage generation module 520 may generate a second voltage having a second level. The first level may be lower than the second level.

The first voltage generation module 510 and the second voltage generation module 520 may configure separate converters, for example, buck converters. The buck converter may include a power terminal including an inductor, an output capacitor, a power switch, and a power diode and a gate control circuit for controlling the power switch of the power terminal, and the first voltage generation module 510 and the second voltage generation module 520 may include the gate control circuit as the configuration of some thereof and may further include the power switch according to embodiments. The remaining elements may be arranged in an external circuit.

The output control circuit 530 may selectively output the first voltage Vo1 and the second voltage Vo2 to the power supply line PL.

The output control circuit 530 may include a first switch SW1 for controlling the output of the first voltage Vo1 to the power supply line PL and a second switch SW2 for controlling the output of the second voltage Vo2 to the power supply line PL. When the first voltage generation module 510 and the second voltage generation module 520 include the output capacitor, the first switch SW1 may be arranged between the first voltage generation module 510 and the power supply line PL, and the second switch SW2 may be arranged between the second voltage generation module 520 and the power supply line PL.

The output control circuit 530 may further include the switch control circuit 532. The switch control circuit 532 may control on/off of the first switch SW1 and the second switch SW2 according to the timing control signal TCS.

The first voltage generation module 510 and the second voltage generation module 520 may be implemented in the form of an integrated circuit. The output control circuit 530 may be implemented as a discrete circuit without being included in the integrated circuit.

Figure 6:
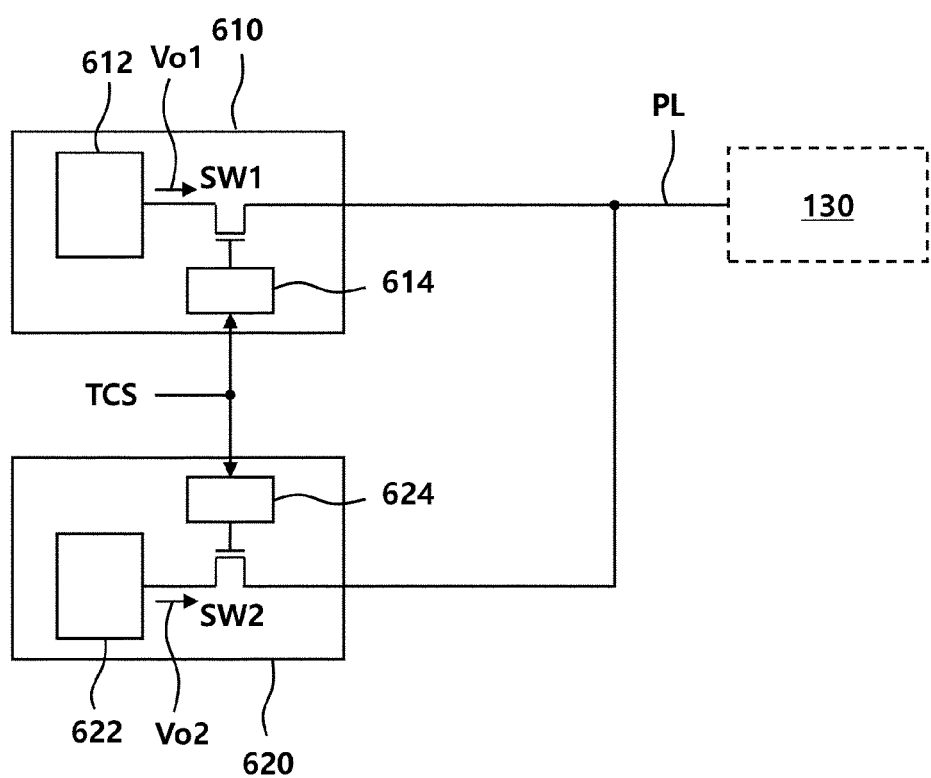
FIG. 6 is a block diagram illustrating a second example of the power management device according to an embodiment.

FIG. 6 is a block diagram illustrating a second example of the power management device according to an embodiment.

Referring to FIG. 6, the power management device 120b may include a first integrated circuit 610, a second integrated circuit 620, and the like.

The first integrated circuit 610 may include a first voltage generation module 612, a first switch SW1, and a first switch control circuit 614.

The first voltage generation module 612 may generate a first voltage Vo1 having a first level. The first voltage generation module 612 may configure a converter, for example, a buck converter. The buck converter may include a power terminal including an inductor, an output capacitor, a power switch, and a power diode and a gate control circuit for controlling the power switch of the power terminal, and the first voltage generation module 612 may include the gate control circuit as the configuration of some thereof and may further include the power switch according to embodiments. The remaining elements may be arranged in an external circuit.

The first switch SW1 may control the output of a first voltage Vo1 to the power supply line PL. The first switch control circuit 614 may control on/off of the first switch SW1 according to the timing control signal TCS and may or may not output the first voltage Vo1 to the power supply line PL.

The second integrated circuit 620 may include a second voltage generation module 622, a second switch SW2, and a second switch control circuit 624.

The second voltage generation module 622 may generate a second voltage Vo2 having a second level. The second voltage generation module 622 may configure a converter, for example, a buck converter. The buck converter may include a power terminal including an inductor, an output capacitor, a power switch, and a power diode and a gate control circuit for controlling the power switch of the power terminal, and the second voltage generation module 622 may include the gate control circuit as the configuration of some thereof and may further include the power switch according to embodiments. The remaining elements may be arranged in an external circuit.

The second switch SW2 may control the output of a second voltage Vo2 to the power supply line PL. The second switch control circuit 624 may control on/off of the second switch SW2 according to the timing control signal TCS and may or may not output the second voltage Vo2 to the power supply line PL.

Figure 7:
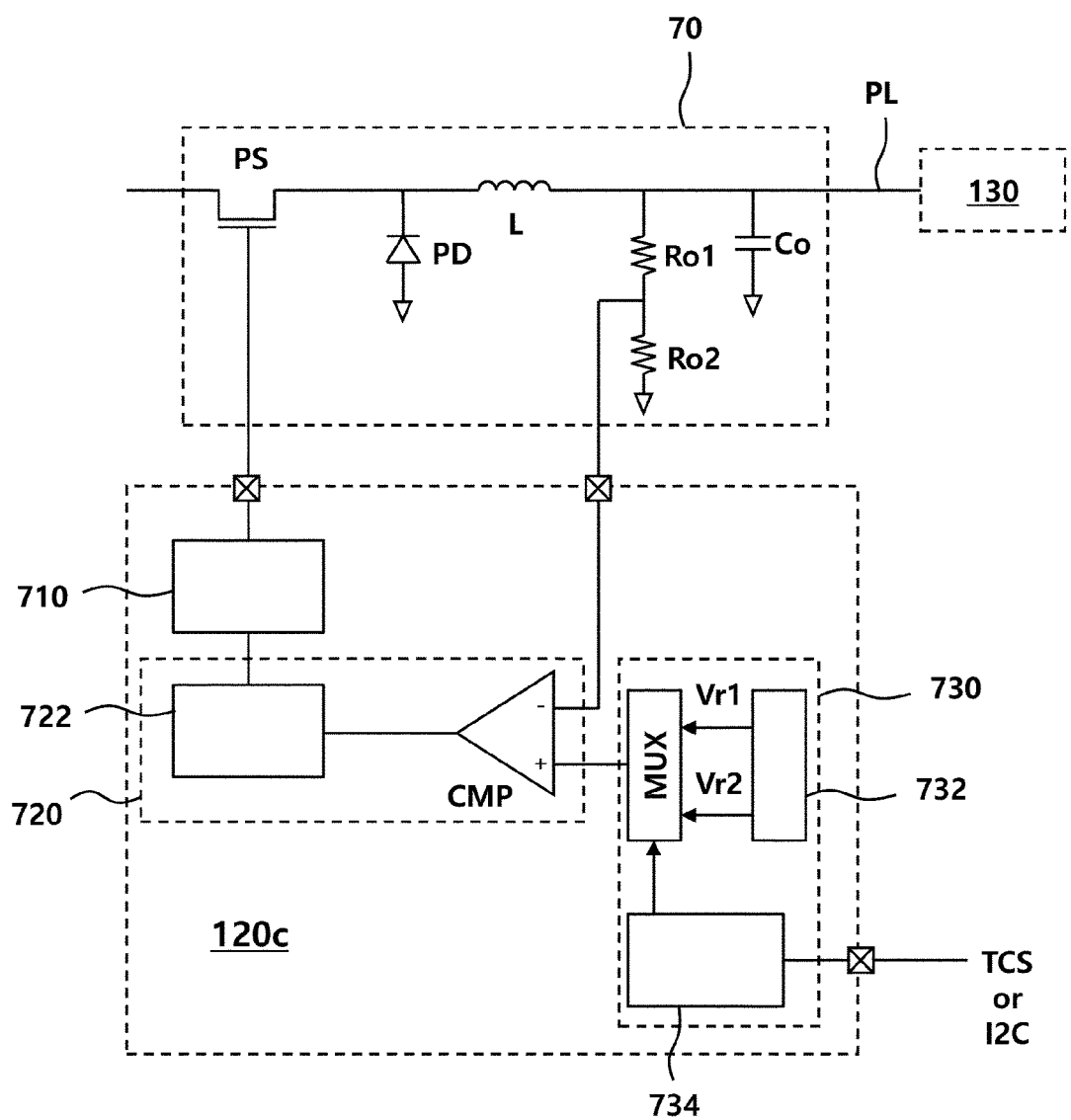
FIG. 7 is a block diagram illustrating a third example of the power management device according to an embodiment.

FIG. 7 is a block diagram illustrating a third example of the power management device according to an embodiment.

Referring to FIG. 7, the power management device 120c may include a gate control circuit 710, a feedback loop circuit 720, a reference control circuit 730, and the like.

The gate control circuit 710 may turn on or off a gate of a power switch PS for controlling voltages on both sides of an inductor L for power conversion. A power terminal 70 may include the power switch PS, a power diode PD, the inductor L, and an output capacitor Co, and the gate control circuit 710 may control on/off of the power switch PS. When the power terminal 70 is configured in the form of a buck converter, a power input voltage and a power output voltage are generated on both sides of the inductor L if the power switch PS is turned on, and a ground voltage and a power output voltage are generated on both sides of the inductor L if the power switch PS is turned off. The gate control circuit 710 may control the voltages on both sides of the inductor L and thus control the output voltage of the power terminal 70.

The feedback loop circuit 720 may sense the output voltage of the power terminal. When sensing the same, the feedback loop circuit 720 may sense the stepped-down voltage on the basis of resistance heating Ro1 and Ro2 as illustrated in FIG. 7. The feedback loop circuit 720 may compare a sensing voltage and a reference through a comparator CMP and generate a comparison signal. Further, the feedback loop circuit 720 may generate a control signal according to the comparison signal through a loop control circuit 722. The loop control circuit 722 may include a Proportional Integral Derivative (PID) circuit, a triangular wave circuit, and the like.

The control signal corresponding to the output of the feedback loop circuit 720 may be transferred to the gate control circuit 710, and the gate control circuit 710 may control the gate of the power switch PS according to the control signal.

The reference control circuit 730 may generate a plurality of references Vr1 and Vr2, and selectively output one of the plurality of references to the feedback loop circuit 720.

The reference control circuit 730 may control the references to correspond to the first voltage in the display time section and control the references to correspond to the second voltage, which is higher than the first voltage, in the touch sensing time section.

The reference control circuit 730 may include a reference generation circuit 732 for generating a plurality of references Vr1 and Vr2, a switch location circuit MUX for selecting and outputting one of the plurality of references Vr1 and Vr2, and a switch control circuit 734 for controlling the switch circuit MUX.

The switch control circuit 734 may receive the timing control signal TCS, and may output the first reference Vr1 through the switch circuit MUX in the display time section and output the second reference Vr2 through the switch MUX in the touch sensing time section according to the timing control signal TCS.

The switch control circuit 734 may receive control values for the references through I2C communication. The switch control circuit 734 may receive the control values through I2C communication and may allow the first reference Vr1 or the second reference Vr2 to be output according to the control value.

Figure 8:
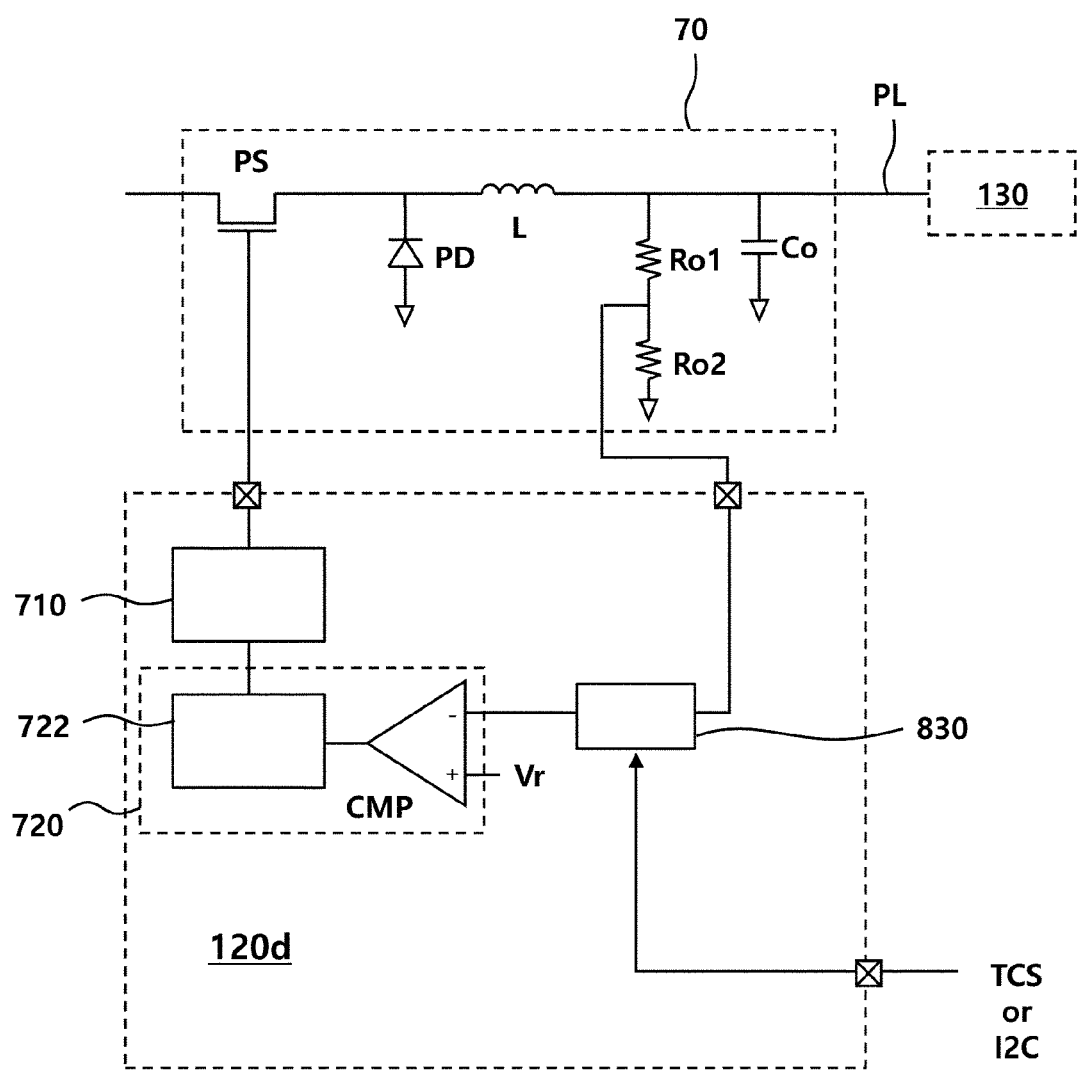
FIG. 8 is a block diagram illustrating a fourth example of the power management device according to an embodiment.

FIG. 8 is a block diagram illustrating a fourth example of the power management device according to an embodiment.

Referring to FIG. 8, the power management device 120d may include the gate control circuit 710, the feedback loop circuit 720, a sensing voltage control circuit 830, and the like.

The control signal corresponding to the output of the feedback loop circuit 720 may be transferred to the gate control circuit 710, and the gate control circuit 710 may control the gate of the power switch PS according to the control signal.

Meanwhile, in the feedback loop circuit 720, a reference Vr may be input into an input terminal of the comparator CMP. Another input terminal of the comparator CMP may be connected to the output of the sensing voltage control circuit 830.

The sensing voltage control circuit 830 may sense the output of the power terminal 70, step-down or boost the output at a predetermined rate, and input the same to the comparator CMP. The sensing voltage control circuit 830 may include a programmable circuit, for example, a programmable resistor, a programmable capacitor, a programmable Digital-Analog-Converter (DAC), and the like, and may change the programmable circuit according to the timing control signal TCS or the communication signal I2C. The sensing voltage control circuit 830 may adjust the sensing rate of the output according to the changed programmable circuit and transfer the same to the feedback loop circuit 720.

The sensing voltage control circuit 830 may adjust the sensing rate of the output using the programmable circuit and differently change a state of the programmable circuit in the display time section and the touch sensing time section. For example, the sensing voltage control circuit 830 may generate a sensing voltage by stepping-down the output. At this time, the sensing voltage control circuit 830 may change the state of the programmable circuit to adjust the step-down rate. The sensing voltage control circuit 830 may generate the sensing voltage by further stepping-down the output in the touch sensing time section than in the display time section. Accordingly, the output voltage can be controlled to be higher in the touch sensing time section than in the display time section.

The sensing voltage control circuit 830 may control the sensing voltage to correspond to the first voltage in the display time section and control the sensing voltage to correspond to the second voltage, which is higher than the first voltage, in the touch sensing time section.

As described above, in the present embodiment, different magnitudes of driving voltages at different times are supplied to the driving devices having different sizes of load at different times, and thus all of the driving devices can stably receive voltages within a limited range even though the number of driving devices increases due to the large size thereof. According to the present embodiment, it is possible to minimize a difference between devices in voltages supplied to display driving devices in spite of the enlargement of display panels. Further, according to the present embodiment, although driving devices perform a plurality of functions and there is a difference between the functions in the current or power use, all of the driving voltages input from the power management device may be within the limited range. In addition, according to the present embodiment, all of the voltages supplied to a plurality of display driving devices may be within the limited range in spite of the enlargement of display panels.

What is claimed is:

1. A display device comprising:
a plurality of driving devices configured to transmit data voltages to pixels disposed on a panel in a display time section and to transmit touch driving signals to the sensors disposed in the panel in a touch sensing time section;
a power management device connected with at least one of the plurality of driving devices through a power supply line and configured to supply a first voltage having a first level to the power supply line in the display time section and to supply a second voltage having a second level higher than the first level to the power supply line in the touch sensing time section; and
a timing control device configured to supply a timing control signal indicating the display time section and the touch sensing time section to the at least one of the plurality of driving devices or to the power management device,
wherein the plurality of driving devices are arranged at different locations along the power supply line and the power management device is configured to control levels of the first voltage and the second voltage such that a difference between a first voltage and a second voltage supplied through the power supply line to a driving device, among the plurality of driving devices, arranged farthest from the power management device is smaller than a difference between a first voltage and a second voltage supplied through the power supply line to a driving device, among the plurality of driving devices, arranged closest to the power management device.

2. The display device of claim 1, wherein the power supply line is arranged via a Flexible Printed Circuit Board (FPCB) or comprises a connector having a physical structure therein.

3. The display device of claim 1, wherein the power management device comprises a plurality of voltage generation modules configured to generate the first voltage and the second voltage and the plurality of voltage generation modules are selectively connected to the power supply line through switch circuits.

4. The display device of claim 1, wherein the at least one of the plurality of driving devices supplies a common voltage to the sensor in the display time section and transmits the touch driving signal to the sensor in the touch sensing time section.

5. The display device of claim 4, wherein an amount of current consumed for generating the touch driving signal is larger than an amount of current consumed for generating the data voltage.

6. A power management device connected with display driving devices through a power supply line, the power management device comprising:
a first voltage generation module configured to generate a first voltage having a first level;
a second voltage generation module configured to generate a second voltage having a second level higher than the first level; and
an output control circuit configured to receive a timing control signal indicating a display time section and a touch sensing time section, to output, through switch circuits, the first voltage to the power supply line in the display time section and the second voltage to the power supply line in the touch sensing time section,
wherein the display driving devices are connected to the power supply line at different locations and a difference between a first voltage and a second voltage supplied through the power supply line to a driving device, among the plurality of driving devices, arranged farthest from the power management device is smaller than a difference between the first voltage and the second voltage supplied through the power supply line to a driving device, among the plurality of driving devices, arranged closest to the power management device.

7. The power management device of claim 6, wherein the display driving devices receive the timing control signal from a timing control device configured to transmit image data and distinguish between a driving time for pixels and a driving time for sensors and the output control circuit receives the timing control signal from the timing control device and recognizes the display time section and the touch sensing time section.

8. The power management device of claim 6, wherein the first voltage generation module is embedded in a first integrated circuit and the second voltage generation module is embedded in a second integrated circuit, and the switch circuits are embedded respectively in the first integrated circuit and the second integrated circuit in a form of an output switch.

\* \* \* \* \*